Patented May 27, 1941

2,243,369

UNITED STATES PATENT OFFICE 2,243,369

MANUFACTURE OF ARTIFICIAL STONES WITH HIGH POROSITY

János Albert, Budapest, Hungary

No Drawing. Application August 26, 1939, Serial No. 292,157. In Hungary August 10, 1939

8 Claims. (Cl. 18—48)

A plurality of methods have been proposed for the manufacture of artificial stones with high porosity owing to their good heat and sound isolating properties. The easiest way to produce such stones consists in using vegetable fillings especially cork. However, not only the comparatively high price of cork forbids its use on large scale but many reasons speak against the use of organic substances in general. The manufacture of highly porous stones purely from organic substances causes serious difficulties, which increase with the decrease of the weight per volume unit required for the stones to be produced. It is evident that raw materials have to be selected for the manufacture of stones of the above said type which present the smallest weight per volume unit available, such as pumice stone, most preferably diatomaceous earth (kieselgur). Moreover it has been tried to unite the granulae by means of cements presenting for themselves the lowest possible weight per volume unit. With pumice stone or kieselgur, presenting more or less reactive silica, lime will be the most suitable binding agent which yields silicate of lime by steaming under pressure in presence of water. As silicate of lime has a relatively high specific weight, the small weight per volume unit for the intermediary cementing substance can be obtained only by imparting to it a porous structure. By this the intermediary cement will be in its final dry state honeycombed with air cells. The finer and more uniform these air cells, the better is the strength of the stone.

Two methods have been followed to produce these air cells. According to the first, gas bubbles are generated in the mortar before its setting. This required the addition of undesirable chemicals. According to another method gas, especially air, has been whipped into the mortar, to impede the settling. In both cases the dispersion of the gases in the mortar was insufficiently fine and uniform, hence, the strength of the stones was low. The addition of foam stabilizing substances such as vegetal mucilages or soap did not produce better result.

Therefore methods had to be explored to obtain the porosity of the intermediary cement in avoiding foam formation. This was possible by using a highly diluted mortar for the production of the stones. The percentage of dry substances in the mortar had to correspond to the weight per volume unit of the stones to be produced, that is to say, that if one cubic metre of the stone ought to weight only 150 kgs., the mortar must not contain more than 150 kgs. dry substance per cubic metre, hence must contain 85% of water. When drying the stones the evaporated water left air-cells in the stone.

This led, however, to a further difficulty, which had to be overcome. The setting periods of such mortars is comparatively long. Hence, the solid particles can settle before the setting proceeds far enough to prevent further settling.

Many proposals have been made to eliminate this drawback.

The one consists in allowing the mortar, before pouring it into the moulds, to set and thicken as far as to prevent further settling. The incompletely set mortar is then stirred to restore complete uniformity and thereupon poured into the moulds. The disturbing of the setting of the mortar reduces substantially the strength of the stones. Other methods were directed to hinder the settling at all. For this purpose it has been proposed to grind the silica nearly to a colloidal fineness or to use it as a solution. This method is very expensive and does not yield stones having a substantial cohesion. According to another method the viscosity of the liquid in which the silica is dispersed should be increased by addition of colloids. This requires, however, so large quantities of colloids, that the setting of the mortar and hence the strength of the stones is severely damaged.

The most important progress on this line was the idea to increase the braking surface of the kieselgur particles by agglomerating thereon a lyosphere by means of a coating which consists of a highly hydrated lime hydro silicate formed by the reaction of caustic alkali or water glass and lime, instead of increasing the viscosity of the ambient liquid. According to a further development of this method, the caustic alkali is liberated from resin soap, so that the lime soap formed at the same time is incorporated with the lyosphere of the kieselgur particles and renders the stones when dried water repellent without filling the pores.

With this method stones can be produced showing a substantial strength with a weight of not more than 0.3 kg. per decimetre cube, and this weight can be reduced as far as 0.1 and still keep a sufficient cohesion of the stone.

Such stones, however, were soft and required very careful handling, the more careful, the farther the weight per volume unit is lowered so that the losses at transport and in working up were substantial.

Hence, it is very desirable to increase the strength and especially the hardness of the stones in spite of keeping their weight per volume unit as low as possible.

According to the invention this result is obtained by adding to a mortar composed substantially of kieselgur and lime and containing, or not, usual fillings such as asbestos fibres, with water exceeding 70% of the total weight of the mortar, a small quantity, preferably less than 5% of the dry substance of the mortar aluminium salts, such as aluminium sulphate, dissolved in water and hardening the stones moulded from said mortar with hot water steam under pressure as usual in the manufacture of sand-lime stones that is to say in saturated steam of above 150° C. preferably up to 170–180° C.

The very voluminous deposit formed by the interaction of the aluminium salt solution with lime prevents by its agglomeration on the surface of the kieselgur particles the settling of the mortar, even at its highest practicable dilution up to 90% water, much more effectively than the addition of caustic alkali or water glass, while the compound formed by the reactions at the steaming of the stones produces a hitherto never obtained hardness of the highly porous kieselgur-limestones.

It is known to add aluminium salts to Portland cement mortars which harden at low temperature to accelerate their setting or to increase their water tightness. But the property of aluminium salts to be able to prevent effectively the settling in highly diluted kieselgur-lime mortars and to multiply the hardness of stones produced from such mortars by steaming owing to the reaction taking place at elevated temperature, has never been observed.

The stones may be rendered water repelling by addition of soap, especially of an emulsion containing resin and resin soap, to the mortar, as known per se.

The strength of the stones and their stability of shape during hardening and drying can be increased by adding to the mortar a mixture suitable for production of artificial resin and condensed to a degree to yield with water a dispersion and by terminating the condensation of the artificial resin in the stones moulded from said mortar, after having hardened the stones in moist condition, by heating the stones a second time in dried condition.

Good results have been obtained with phenol-formaldehyde or carbamide-formaldehyde mixtures, which, as long as uncondensed, are soluble in water. The mixtures are subjected to condensation until they loose their solvability in water. Care must be taken, however, not to proceed with the condensation so far, that the product of reaction poured into water would separate from this latter, but only so far, that the product of reaction mixed with water forms an emulsion. The addition of such product to the mortar in a ratio of 2 to 5% of the dry substance gives very satisfactory results.

According to a higher hardness or a higher bending strength is required, a mixture of phenol and formaldehyde or a mixture of carbamide and formaldehyde is used. By using phenol-formaldehyde and carbamide-formaldehyde condensation mixtures simultaneously and by appropriately choosing the ratio of phenol and carbamide, the hardness and bending strength can be varied according to the requirements.

The increase in material costs caused by addition of the condensation products can be balanced by the decrease of the quantity of dry substance of the mortar used for the manufacture of the stones, because the increase of strength produced by said addition exceeds the decrease of strength caused by the reduction of the density of the stones.

*Examples*

I

A mortar is prepared from

| | | |
|---|---|---|
| Kieselgur | kgs | 48 |
| Lime slacked to powder | kgs | 45 |
| Asbestos or slag wool | kgs | 5 |
| Water | litres | 400 |

To this mortar are added 2.5 kgs. of aluminium sulphate dissolved in 50 litres of water.

The mortar is poured into moulds and hardened at 170° centigrade and 8 atm. pressure during 2–5 hours in steam in the manner known in manufacture of lime-sand stones.

II

To the mortar prepared according to Example I are added:

1 kg. of aluminium sulphate dissolved in 30 litres of water and a dispersion prepared with 20 litres of water and 1.5 kgs. of a condensation product obtained from 1 part by weight of phenol (95% commercial product) and 2 parts by weight of formaldehyde (40% commercial product) by heating to 120° centigrade during 3 hours.

The stones are produced from this mixture as described in Example I with the difference that after drying, the stones are heated a second time during 24 hours to 80–100° centigrade in order to terminate the condensation of the resin.

III

One proceeds according to Example II with the difference that the product of condensation is obtained from a mixture of 1 part by weight of commercial carbamide and 3 parts by weight of formaldehyde by stirring during 3 hours at room temperature.

IV

Water repellent stones are produced by adding to the mortar prepared according to Example I an emulsion prepared from 10 kgs. resin with 50 litres of water by saponification with 1 kg. caustic soda and 250 grams concentrated ammonia. Thereupon 1 kg. of aluminium sulphate dissolved in 30 litres of water and 1.5 kgs. of a condensation product according to Example II or III dispersed in 20 litres of water are added to the mortar from which the stones are manufactured according to Example II.

The ratio given in all the examples will produce stones with a weight of 0.2 kg. per decimetre cube.

What I claim is:

1. The method consisting in preparing a mortar containing substantially kieselgur, lime and water, adding aluminium salt dissolved in sufficient water to raise the water content of the mortar above 70%, pouring the mortar in moulds and hardening in steam.

2. The method consisting in preparing a mortar containing substantially kieselgur, lime and water, adding aluminium salt dissolved in sufficient water to raise the water content of the mortar above 70%, pouring the mortar in moulds and hardening in saturated steam above a temperature of 150° centigrade.

3. The method consisting in preparing a mortar containing substantially kieselgur, lime and water, adding less than 5% of the dry substance weight of the mortar aluminium salt dissolved in sufficient water to raise the water content of the mortar above 70%, pouring the mortar in moulds and hardening in steam.

4. The method consisting in preparing a mortar containing substantially kieselgur, lime and water, adding aluminium salt dissolved in water, adding further an emulsion of a condensation mixture adapted to yield artificial resin which is condensated to a degree to form with water an emulsion, diluting the emulsion to raise the water content of the mortar above 70%, pouring the mortar in moulds and hardening in steam, drying the stones and heating a second time to terminate the condensation of the artificial resin.

5. The method consisting in preparing a mortar containing substantially kieselgur, lime and water, adding aluminium salt dissolved in water, adding further an emulsion of a condensation mixture consisting of phenol and formaldehyde which is condensated to a degree to form with water an emulsion, diluting the emulsion to raise the water content of the mortar above 70%, pouring the mortar in moulds and hardening in steam, drying the stones and heating a second time to terminate the condensation of the artificial resin.

6. The method consisting in preparing a mortar containing substantially kieselgur, lime and water, adding aluminium salt dissolved in water, adding further an emulsion of a condensation mixture consisting of carbamide and formaldehyde which is condensated to a degree to form with water an emulsion, diluting the emulsion to raise the water content of the mortar above 70%, pouring the mortar in moulds and hardening in steam, drying the stones and heating a second time to terminate the condensation of the artificial resin.

7. The method consisting in preparing a mortar containing substantially kieselgur, lime and water, adding aluminium salt dissolved in water, adding further an emulsion of a condensation mixture consisting of phenol, carbamide and formaldehyde, which is condensated to a degree to form with water an emulsion, diluting the emulsion to raise the water content of the mortar above 70%, pouring the mortar in moulds and hardening in steam, drying the stones and heating a second time to terminate the condensation of the artificial resin.

8. The method consisting in preparing a mortar containing substantially kieselgur, lime and water, adding aluminium salt dissolved in water, adding further less than 5% of the dry substance content of the mortar of an emulsion of a condensation mixture adapted to yield artificial resin which is condensated to a degree to form with water an emulsion, diluting the emulsion to raise the water content of the mortar above 70%, pouring the mortar in moulds and hardening in steam, drying the stones and heating a second time to terminate the condensation of the artificial resin.

JÁNOS ALBERT.